US011526766B2

(12) United States Patent
Song et al.

(10) Patent No.: US 11,526,766 B2
(45) Date of Patent: *Dec. 13, 2022

(54) GRAPHICAL STRUCTURE MODEL-BASED TRANSACTION RISK CONTROL

(71) Applicant: Advanced New Technologies Co., Ltd., Grand Cayman (KY)

(72) Inventors: Le Song, Hangzhou (CN); Hui Li, Hangzhou (CN); Zhibang Ge, Hangzhou (CN); Xin Huang, Hangzhou (CN); Chunyang Wen, Hangzhou (CN); Lin Wang, Hangzhou (CN); Tao Jiang, Hangzhou (CN); Yiguang Wang, Hangzhou (CN); Xiaofu Chang, Hangzhou (CN); Guanyin Zhu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 21 days.

This patent is subject to a terminal disclaimer.

(21) Appl. No.: 16/805,387

(22) Filed: Feb. 28, 2020

(65) Prior Publication Data

US 2020/0202219 A1    Jun. 25, 2020

Related U.S. Application Data

(63) Continuation of application No. PCT/CN2018/112345, filed on Oct. 29, 2018.

(30) Foreign Application Priority Data

Dec. 15, 2017  (CN) .......................... 201711348424.7

(51) Int. Cl.
*G06N 3/08* (2006.01)
*G06F 16/23* (2019.01)
(Continued)

(52) U.S. Cl.
CPC ......... *G06N 3/084* (2013.01); *G06F 16/2365* (2019.01); *G06F 16/2379* (2019.01);
(Continued)

(58) Field of Classification Search
USPC ............................................. 705/38
See application file for complete search history.

(56) References Cited

U.S. PATENT DOCUMENTS 9,659,560 B2 * 5/2017 Cao ........................... G06N 3/04
2003/0174165 A1 * 9/2003 Barney ................. G06T 11/206
715/747

(Continued)

FOREIGN PATENT DOCUMENTS

CA          2834265           6/2014
CA          3039386 C  *      7/2021    ......... G06F 17/2705
(Continued)

OTHER PUBLICATIONS

Jepsen; Tobias, How to do Deep Learning on Graphs with Graph Convolutional Networks, Sep. 18, 2018, Towards Data Science, (https://towardsdatascience.com/how-to-do-deep-learning-on-graphs-with-graph-convolutional-networks-7d2250723780) (Year: 2018).*

(Continued)

*Primary Examiner* — Paul S Schwarzenberg
(74) *Attorney, Agent, or Firm* — Fish & Richardson P.C.

(57) ABSTRACT

One or more implementations of the present specification provide risk control of transactions based on a graphical structure model. A graphical structure model trained by using labeled samples is obtained. The graphical structure model is defined based on a transaction data network that includes nodes representing entities in a transaction and edges representing relationships between the entities. Each labeled sample includes a label indicating whether a node corresponding to the labeled sample is a risky transaction (Continued)

node. The graphical structure model is configured to iteratively calculate an embedding vector of the node in a latent feature space based on an original feature of the node or a feature of an edge associated with the node. An embedding vector of an input sample is calculated by using the graphical structure model. Transaction risk control is performed on the input sample based on the embedding vector.

32 Claims, 5 Drawing Sheets

(51) Int. Cl.
*G06N 3/04* (2006.01)
*G06Q 20/40* (2012.01)
*G06Q 40/02* (2012.01)

(52) U.S. Cl.
CPC ............ *G06N 3/04* (2013.01); *G06N 3/0481* (2013.01); *G06Q 20/4016* (2013.01); *G06Q 40/02* (2013.01)

(56) References Cited

U.S. PATENT DOCUMENTS

| | | | | |
|---|---|---|---|---|
| 2005/0182708 | A1* | 8/2005 | Moudgal | G06Q 99/00 705/38 |
| 2005/0182709 | A1 | 8/2005 | Moudgal | |
| 2009/0018940 | A1 | 1/2009 | Wang et al. | |
| 2014/0317033 | A1 | 10/2014 | Mojsilovic et al. | |
| 2014/0337972 | A1 | 11/2014 | Foster et al. | |
| 2015/0082448 | A1 | 3/2015 | Elovici et al. | |
| 2016/0035035 | A1* | 2/2016 | Posch | G06Q 40/02 705/36 R |
| 2016/0042355 | A1* | 2/2016 | Wang | G06Q 20/4014 705/39 |
| 2016/0300059 | A1 | 10/2016 | Abrams et al. | |
| 2016/0328388 | A1 | 11/2016 | Cao et al. | |
| 2017/0140382 | A1 | 5/2017 | Chari et al. | |
| 2018/0053071 | A1* | 2/2018 | Chen | G06N 20/10 |
| 2019/0080383 | A1* | 3/2019 | Garcia Duran | G06F 16/9536 |
| 2019/0095806 | A1* | 3/2019 | Martinez Canedo | G06Q 10/04 |
| 2019/0130406 | A1* | 5/2019 | Marcjan | G06N 20/00 |
| 2019/0378051 | A1* | 12/2019 | Widmann | G06Q 30/0185 |
| 2020/0125820 | A1* | 4/2020 | Kim | G06N 3/08 |
| 2022/0114661 | A1* | 4/2022 | Sarshogh | G06Q 10/10 |

FOREIGN PATENT DOCUMENTS

| | | |
|---|---|---|
| CN | 104199832 | 12/2014 |
| CN | 104636912 | 5/2015 |
| CN | 104778605 | 7/2015 |
| CN | 105005931 | 10/2015 |
| CN | 105335855 | 2/2016 |
| CN | 105389732 | 3/2016 |
| CN | 105556552 | 5/2016 |
| CN | 105719033 | 6/2016 |
| CN | 105931046 | 9/2016 |
| CN | 106097090 | 11/2016 |
| CN | 106327340 | 1/2017 |
| CN | 106372938 | 2/2017 |
| CN | 106469376 | 3/2017 |
| CN | 106547838 | 3/2017 |
| CN | 106548302 | 3/2017 |
| CN | 106611137 | 5/2017 |
| CN | 107133865 | 9/2017 |
| CN | 107256465 | 10/2017 |
| CN | 107305611 | 10/2017 |
| CN | 107392456 | 11/2017 |
| TW | I466706 | 1/2015 |
| TW | 201626300 | 7/2016 |

OTHER PUBLICATIONS

Hamilton et al., Representation Learning on Graphs: Methods and Applications v3, Apr. 10, 2018, Department of Computer Science, Stanford University, IEEE Data Engineering Bulletin, pp. 1-24 (https://doi.org/10.48550/arXiv.1709.05584) (Year: 2018).*
U.S. Appl. No. 16/809,308, Song et al., filed Mar. 4, 2020.
U.S. Appl. No. 16/805,538, Song et al., filed Feb. 28, 2020.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in Application No. 18888001.7, dated Jul. 15, 2020, 8 pages.
International Preliminary Report on Patentability in International Application No. PCT/CN2018/110730, dated Jun. 16, 2020, 8 pages (with partial English translation).
International Preliminary Report on Patentability in International Application No. PCT/CN2018/112345, dated Jun. 16, 2020, 8 pages (with partial English translation).
International Search Report and Written Opinion in PCT Appln. No. PCT/CN2018/110730, dated Jan. 9, 2019, 11 pages (with machine translation).
International Search Report and Written Opinion in PCT Appln. No. PCT/CN2018/112345, dated Jan. 30, 2019, 12 pages (with machine translation).
Extended European Search Report in Application No. 18887759.1, dated Oct. 19, 2020, 8 pages.
Hamilton et al., "Representation Learning on Graphs: Methods and Applications", Department of Computer Science, 2017, 23 pages.

* cited by examiner

GRAPHICAL STRUCTURE MODEL-BASED TRANSACTION RISK CONTROL

CROSS-REFERENCE TO RELATED APPLICATIONS

This application is a continuation of PCT Application No. PCT/CN2018/112345, filed on Oct. 29, 2018, which claims priority to Chinese Patent Application No. 201711348424.7, filed on Dec. 15, 2017, and each application is hereby incorporated by reference in its entirety.

TECHNICAL FIELD

The present specification relates to the field of computer software technologies, and in particular, to a method, apparatus, and device for transaction risk control based on a graphical structure model.

BACKGROUND

With the rapid development of computer and Internet technologies, many services can be carried out through the Internet, typically e-commerce and payment services. Based on e-commerce and payment platforms, users can conduct transactions conveniently. These platforms bring convenience as well as risks to the users. Some users with abnormal behaviors such as cheating might threaten transaction security and cause losses to funds or other interests of other users.

In existing technologies, risk control on user transactions often relies on user complaints, manual reviews on platforms, etc.

Based on the existing technologies, more effective solutions for transaction risk control are needed.

SUMMARY

Implementations of the present specification provide a method, apparatus, and device for transaction risk control based on a graphical structure model, to alleviate the following technical problem: lack of a more effective solution for transaction risk control.

To alleviate the technical problem, the implementations of the present specification are implemented as follows.

An implementation of the present specification provides a method for transaction risk control based on a graphical structure model, including: obtaining a graphical structure model trained by using labeled samples, where the graphical structure model is defined based on a transaction data network, and the transaction data network includes one or more nodes of a buyer user, a seller user, an e-commerce platform account, a third-party payment platform account, a bank card, and a product, and a relationship between the nodes; and the graphical structure model is configured to calculate embedding vectors of the nodes obtained after a plurality of iterations in a latent feature space based on original features of the nodes and/or features of associated edges between the nodes; calculating embedding vectors corresponding to to-be-tested samples by using the trained graphical structure model; and performing transaction risk control on the to-be-tested samples based on the corresponding embedding vectors; where the labeled samples are labeled whether a node corresponding to the labeled samples is a transaction risk node.

An implementation of the present specification provides an apparatus for transaction risk control based on a graphical structure model, including: an acquisition module, configured to obtain a graphical structure model trained by using labeled samples, where the graphical structure model is defined based on a transaction data network, and the transaction data network includes one or more nodes of a buyer user, a seller user, an e-commerce platform account, a third-party payment platform account, a bank card, and a product, and a relationship between the nodes; and the graphical structure model is configured to calculate embedding vectors of the nodes obtained after a plurality of iterations in a latent feature space based on original features of the nodes and/or features of associated edges between the nodes; a calculation module, configured to calculate embedding vectors corresponding to to-be-tested samples by using the trained graphical structure model; and a risk control module, configured to perform transaction risk control on the to-be-tested samples based on the embedding vectors corresponding to the to-be-tested samples; where the labeled samples are labeled whether a node corresponding to the labeled samples is a transaction risk node.

An implementation of the present specification provides a device for transaction risk control based on a graphical structure model, including: at least one processor; and at least one memory connects to and communicates with the at least one processor, where the memory stores an instruction executable by the at least one processor, and the instruction is executed by the at least one processor to enable the at least one processor to: obtain a graphical structure model trained by using labeled samples, where the graphical structure model is defined based on a transaction data network, and the transaction data network includes one or more nodes of a buyer user, a seller user, an e-commerce platform account, a third-party payment platform account, a bank card, and a product, and a relationship between the nodes; and the graphical structure model is configured to calculate embedding vectors of the nodes obtained after a plurality of iterations in a latent feature space based on original features of the nodes and/or features of associated edges between the nodes; calculate embedding vectors corresponding to to-be-tested samples by using the trained graphical structure model; and perform transaction risk control on the to-be-tested samples based on the embedding vectors corresponding to the to-be-tested samples; where the labeled samples are labeled whether a node corresponding to the labeled samples is a transaction risk node.

At least one of the described technical solutions adopted in the implementations of the present specification can achieve the following beneficial effects: structure features, node features, and edge features of a transaction data network can be effectively integrated, embedding vectors and/or a prediction probability corresponding to a user can be calculated, and transaction risk control can be effectively performed on the user based on the embedding vectors and/or the prediction probability.

BRIEF DESCRIPTION OF DRAWINGS

To describe the technical solutions in the implementations of the present specification or in the existing technology more clearly, the following briefly describes the accompanying drawings needed for describing the implementations or the existing technology. Apparently, the accompanying drawings in the following description are merely some implementations of the present specification, and a person of ordinary skill in the art can derive other drawings from these accompanying drawings without creative efforts.

DESCRIPTION OF EMBODIMENTS

Implementations of the present specification provide a graphical structure model training method, apparatus and device, and a method, apparatus, and device for transaction risk control based on a graphical structure model.

To enable a person skilled in the art to better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present application. Based on the implementations of the present specification, other embodiments obtained by a person of ordinary skill in the art without creative efforts shall fall within the protection scope of the present application.

In e-commerce and payment services, platforms accumulate a great deal of transaction data and fund payment data. These services often include a lot of abnormal behaviors, such as cash-out, fraud transaction, cheating, etc. These abnormal behaviors can cause risks to user transaction security. Therefore, how to identify risky buyers and sellers becomes an industry problem.

In the e-commerce and payment services, the platforms also accumulate a great deal of network relationship data, such as a transaction relationship between a buyer and a seller, a purchase and collection relationship between a user and a product, an upstream and downstream relationship between merchants of a supply chain, a family and social attribute relationship between users, a capital inflow and outflow relationship between a user and a bank card, a relationship formed by browsing behaviors or movement tracks of a user during a period of time, etc. There is a complete interest chain behind each abnormal behavior. These interest chains form a network of crimes. The present disclosure considers learning abnormal transaction patterns from these complex networks for risk control, to alleviate a user transaction security problem.

In conventional machine learning and data analysis, different samples often lack information interaction, and nodes can be considered as individuals. However, different samples often have very close connections in practice. For example, a cash-out gang organizes cash-out and fraud for a group of buyers, which implies a whole set of organized and planned transactions and fund network relationships. Combining interaction behaviors of different nodes helps better identify a target group and regular patterns behind. Conventional deep learning technologies cannot be used for representation and feature learning of composite structure data such as graphics, networks, and dynamic networks. Deriving network features depending on a manual method is time-consuming and results are often uncontrollable. Even experienced data analysts can enumerate only some network features within their cognitive scopes. In addition, network structures in actual applications change continuously over time. Relying on service experience for network attacks and defense is inadequate.

The present disclosure can effectively integrate node features and edge features, support a plurality of types of heterogeneous networks, and adapt to network changes. A training process can optimize the graphical structure model directly for a service objective, and then risk control can be performed effectively to ensure user transaction security.

Figure 1:
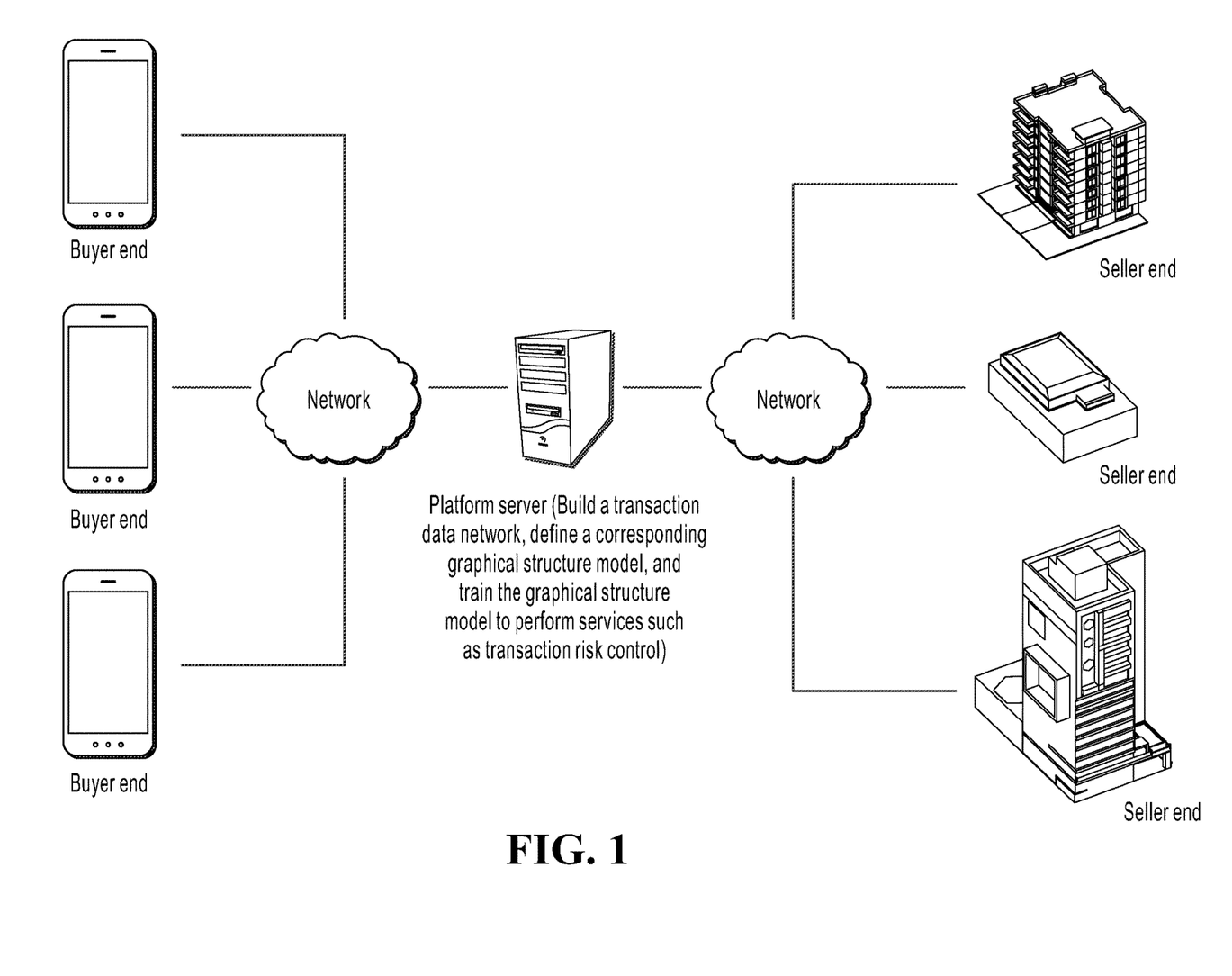
FIG. 1 is a schematic diagram illustrating an overall architecture related to a solution of the present specification in an actual application scenario.

FIG. 1 is a schematic diagram illustrating an overall architecture related to a solution of the present specification in an actual application. The overall architecture mainly involves three parts: each buyer end, each seller end, and a platform server. The platform server can include one or more devices. The platform server builds a transaction data network based on user transaction-related data between a buyer end and a seller end, defines a corresponding graphical structure model and trains the model to perform risk control on a user transaction between a buyer end and a seller end.

The following describes the solution of the present specification in detail based on the architecture in FIG. 1.

Figure 2:
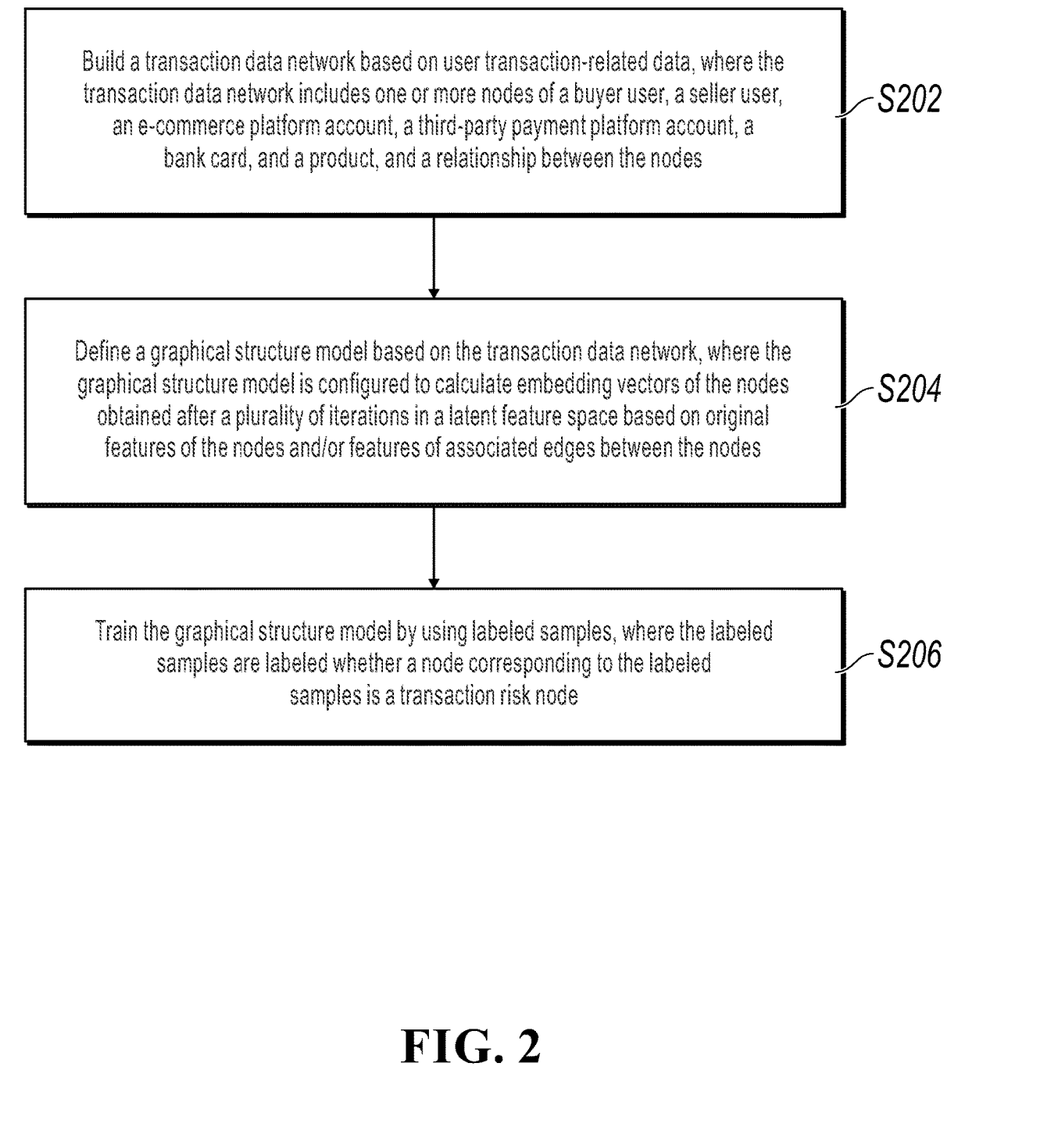
FIG. 2 is a schematic flowchart illustrating a graphical structure model training method, according to an implementation of the present specification.

FIG. 2 is a schematic flowchart illustrating a graphical structure model training method, according to an implementation of the present specification. A process in FIG. 2 includes the following steps.

S202: Build a transaction data network based on user transaction-related data, where the transaction data network includes one or more nodes of a buyer user, a seller user, an e-commerce platform account, a third-party payment platform account, a bank card, and a product, and a relationship between the nodes.

In an implementation of the present specification, the user transaction-related data can include transaction data recorded in orders, such as a transaction amount, a transaction time, and attribute information of a buyer and a seller. The data can further include environmental information of a buyer and a seller at the time of transaction, such as information about devices used by the buyer and the seller, a location based service (LBS) information, a network IP address, and Wi-Fi information.

In an implementation of the present specification, the buyer user and the seller user both can refer to a natural person, and can be specifically represented by using an identity of the natural person, such as an identity card number and biological feature information. The natural person and an account of any platform are generally in a one-to-one relationship, but may alternatively be in a one-to-many relationship. For example, a buyer user might have a plurality of third-party payment platform accounts.

In addition to the buyer user node and the seller user node, other nodes listed previously can also be represented by corresponding identification information. For example, a bank card can be represented by a corresponding bank card number, and a product can be represented by a corresponding product number or a corresponding product name and model.

In an implementation of the present specification, the transaction data network can include one type of network or a combination of multiple types of heterogeneous networks and can be built to adapt to an actual demand.

For example, the transaction data network can include a transaction network formed by a buyer user and a seller user, where accordingly a network node can represent a buyer user or a seller user, and an edge can represent an existing transaction relationship between the buyer user and the seller user; a relationship network of a buyer user and a debit card corresponding to a buyer user account, where accordingly a network node can represent a user account or a debit card, and an edge can represent a specific user account of the debit card; a relationship network of a buyer user and a credit card corresponding to a buyer user account, where accordingly a network node can represent a user account or a credit card, and an edge can represent a specific user account of the credit card; a same-person relationship network between user accounts, where accordingly a network node can represent a user account, and an edge can represent which user accounts belong to the same user; a family relationship network between user accounts, where accordingly a network node can represent a user account, and an edge can represent specific user accounts, and users corresponding to the user accounts belong to the same family; and a network formed by a buyer user and a product, where accordingly a network node can represent a buyer user or a product, and an edge can represent a buyer user that buys a product.

In an implementation of the present specification, the transaction data network is graph data, which is intuitive and can be conveniently processed by using a graph algorithm. Therefore, efficiency is relatively high.

Nodes in the transaction data network can contain original features of the nodes. The original features include at least one of the following types of transaction data: a transaction amount, a quantity of transactions, a transaction time, a transaction location, a transaction target, a transaction payment method, etc. Specifically, for example, the original features include a transaction amount that exceeds certain scales within a period of time, a quantity of transactions, and a quantity of transaction days, a quantity of cities in which transactions occur, a quantity of devices used, an amount and proportion of debit card transactions, an amount and proportion of credit card transactions, an amount and proportion of credit transactions other than credit card transactions, etc.

Edges in the transaction data network can include associated features of nodes that are connected by the edges, for example, transaction data and/or interpersonal relationship data jointly involved by the nodes connected to the edges. Assume that the two nodes connected to the edge are respectively a certain buyer user and a certain seller user. In such a case, features of the edge can include, for example, between the buyer user and the seller user within a period of time, a transaction amount, a quantity of transactions, a quantity of cities in which transactions occur, and information about whether the buyer user and the seller user are friends.

S204: Define a graphical structure model based on the transaction data network, where the graphical structure model is configured to calculate an embedding vector of the node obtained after a plurality of iterations in a latent feature space based on an original feature of the node and/or a feature of an associated edge between the nodes.

In an implementation of the present specification, the original features and the features of the edges of the nodes in the transaction data network can be integrated to define a feature space. Furthermore, the graphical structure model is defined based on one or more feature spaces, a pending weight matrix of the feature space, and a specified nonlinear transformation function.

The weight matrix is used to perform a linear transformation on the feature space. The nonlinear transformation function is used to perform a nonlinear transformation on the feature space. Therefore, the original feature and edge feature of the node can finally be mapped to a more complex latent feature space by using the graphical structure model. The embedding vector can reflect a feature embedded by the corresponding node into the final latent feature space.

When there are a plurality of iterations, the feature space can further be defined based on a previous iteration result. Compared with a feature space defined based on the original feature or the feature of the edge of the node, the feature space can also be considered as a latent feature space.

Based on the previous analysis, an embedding vector of the node obtained after each iteration in the latent feature space is calculated based one or a combination of the following factors: the original feature of the node, a feature of an associated edge between the node and another node, and an embedding vector of the node obtained after one or more previous iterations in the latent feature space.

S206: Train the graphical structure model by using labeled samples, where the labeled samples are labeled whether a node corresponding to the labeled samples is a transaction risk node.

In an implementation of the present specification, some existing samples can be labeled in advance as risk samples or non-risk samples to train a graphical structure model. Any sample can correspond to a node in the graphical structure model. A node corresponding to an abnormal sample is an abnormal node. During transaction risk control, a sample is generally a labeled buyer user or seller user, or a corresponding user account. Certainly, a sample can also refer to another element involved in a transaction, such as a debit card or a credit card bound to the user account. These elements can also serve as nodes in the graphical structure model.

The following implementations are mainly described by using examples that samples are users. Generally, based on an actual complaint penalty or a manual review result, a buyer user and a seller user who are identified as having abnormal behaviors such as cheating can be regarded as risk users and labeled. In an actual service, they can be labeled once a day, or labeled for several days together, etc.

A standard used for labeling can be defined based on an actual demand. For example, if a user is identified as having abnormal behaviors in historical transactions, and a quantity of the historical transactions is not less than a specified quantity, the user is labeled as a transaction risk user (namely, a transaction risk node in the graphical structure model). For another example, if a user is identified as having repayment overdue behaviors on a credit card bound to a transaction account for a quantity of times, and the quantity of times is not less than a specified quantity, the user is labeled as a transaction risk user.

In an implementation of the present specification, training the graphical structure model aims to determine an appropriate weight matrix so that an embedding vector calculated based on the trained graphical structure model can express a nature of a node corresponding to the embedding vector as truthfully as possible, for example, whether the node is a transaction risk node.

The method in FIG. 2 can effectively integrate structure features, node features, and edge features of a heterogeneous or homogeneous transaction data network, define and train a graphical structure model, and calculate embedding vectors of nodes in a latent feature space based on the graphical structure model. The embedding vectors are used for risk control on a user transaction.

Based on the method in FIG. 2, an implementation of the present specification further provides some specific implementing solutions of the method as well as extensions to continue the description.

In an implementation of the present specification, the graphical structure model is further configured to calculate a prediction probability of the node based on the embedding vector. During transaction risk control, the prediction probability can represent a probability that a node is a transaction risk node.

In an implementation of the present specification, a description and a training process of the graphical structure model are intuitively illustrated by using an example. Assume that T represents a quantity of iterations; there are n nodes in total; $y_i$ represents a labeling result of the ith node (for example, a risk node is labeled as 1 and a non-risk node is labeled as 0); $F_i$ represents original features of the ith node (a feature dimension is f); $E_{ij}$ represents features of associated edges between the ith node and the jth node (a feature dimension is e); $N_i$ represents a set of adjacent nodes of the ith node; a dimension of a final latent feature space that needs feature embedding is h; and $H_i^t$ represents embedding vectors of the ith node obtained after t iterations in the latent feature space.

Assume that an embedding vector of the node obtained after t iterations in the latent feature space is calculated based on the original feature of the node, a feature of an associated edge between the node and another node, and an embedding vector of the node obtained after t−1 iterations in the latent feature space. An example graphical structure model is defined as follows:

"$W_1$ (h*f dimensions), $W_2$ (h*e dimensions), $W_3$ (h*h dimensions), and $W_4$ (h*2 dimensions) are initialized, for example, by using standard Gaussian distribution;
for t=1 to T: //executing T iterations
   for i=0 to n−1: //traversing n nodes $$H_i^t = \sigma\left(W_1 F_i + W_2 \sum_{j \in N_i} E_{ij} + W_3 \sum_{j \in N_i} \alpha_{ij} H_i^{t-1}\right);$$

//(equation 1) a process of the tth iteration of the ith node.
for t=° to n−1: //traversing n nodes $$pred_i = \text{softmax}(W_4 * H_i^T);$$

//(equation 2) a prediction probability of the ith node obtained after T iterations optimize arg $\min_{W_1, W_2, W_3, W_4} \Sigma_i \text{corss\_entrep}(pred_i, y_i)$; and
//(equation 3) a prediction probability of the ith node obtained after T iterations; where
σ represents a nonlinear transformation function (such as Relu, Sigmoid, Tanh, etc.), $W_1$, $W_2$, $W_3$, and $W_4$ represent weight matrices, $\alpha_{ij}$ represents a weight matrix (such as a diagonal matrix) for the ith node and the jth node, $pred_i$ represents a prediction probability of the ith node obtained after T iterations, and corss_entrep represents a function used to calculate cross entropy.

In the previous example, training the graphical structure model by using labeled samples in step S206 can specifically include: optimizing arg $\min_{W_1, W_2, W_3, W_4} \Sigma_i \text{corss\_entrep}(pred_i, y_i)$ by using a back-propagation algorithm and the labeled samples to obtain optimal $W_1$, $W_2$, $W_3$, and $W_4$. The optimization objective here is set based on cross entropy of a prediction probability and a labeling result. It is worthwhile to note that the optimization objective can be set based on a parameter other than the cross entropy, where the parameter can measure consistency between a prediction probability and a labeling result. The optimization objective is to maximize the consistency between a prediction probability and a labeling result.

The described equations 1, 2 and 3 are examples and not unique. For example, respective items of $F_i$, $E_{ij}$, $H_i^{t-1}$ in equation 1 can be transformed through multiplication, exponent or logarithm, or two of the items can be combined, or one of the items can be deleted. For another example, the softmax function in equation 2 can be replaced with another suitable normalization function.

Furthermore, after training the graphical structure model, an embedding vector and/or a prediction probability of an existing sample and an embedding vector and/or a prediction probability of a new sample can be calculated by using the trained graphical structure model through forward propagation. Further, the calculated embedding vector and/or prediction probability can be used for a sample-related service. For example, the embedding vector is used as input of other models (for example, used as input to other supervised, unsupervised or reinforcement learning for re-integration), or the embedding vector or the prediction probability is directly used to determine a nature of a corresponding sample. Transaction risk control is used as an example. When a prediction probability of a user is higher than a certain threshold, the user can be identified as a transaction risk user.

Figure 3:
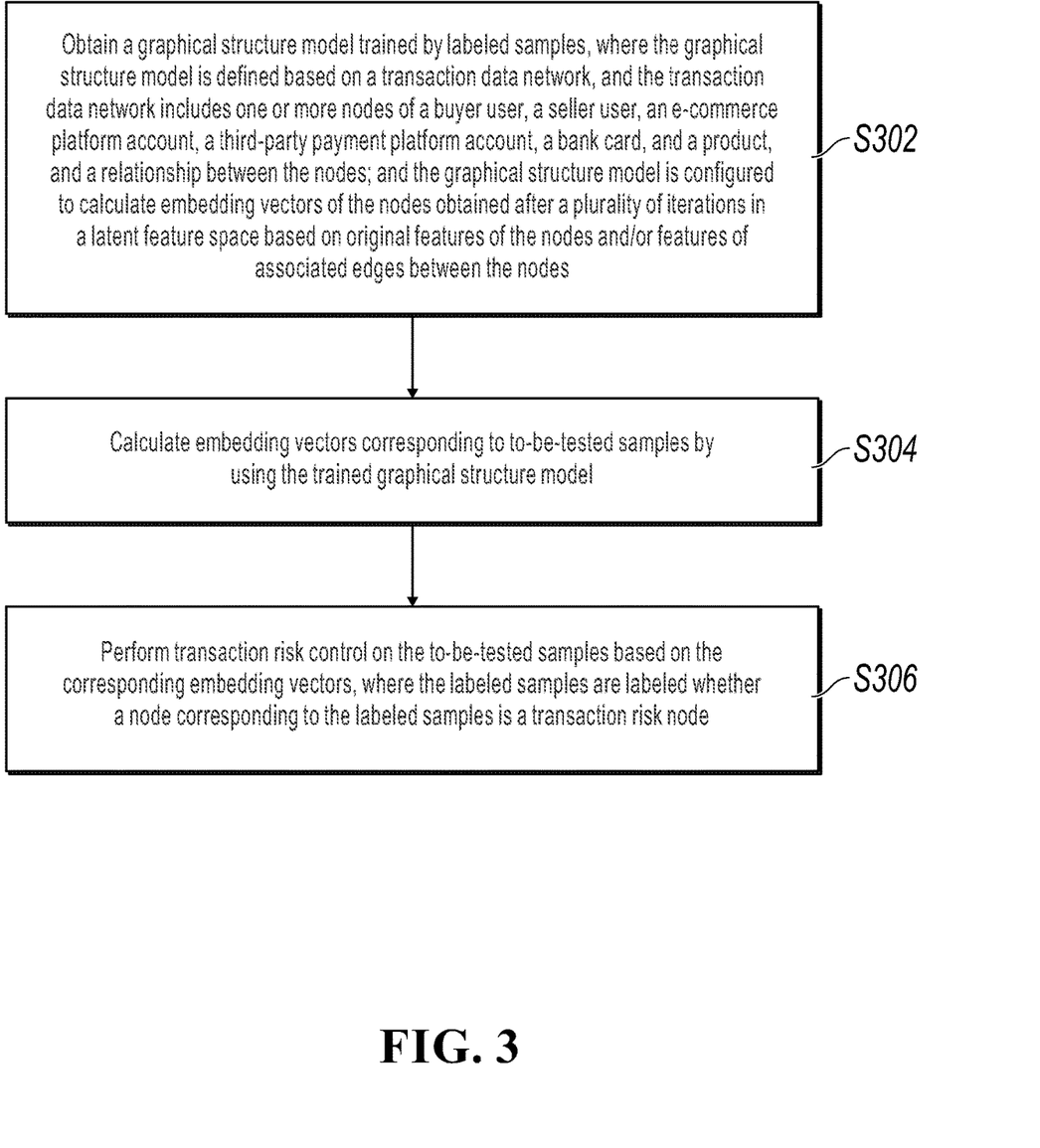
FIG. 3 is a schematic flowchart illustrating a method for transaction risk control based on a graphical structure model, according to an implementation of the present specification.

Based on the same idea, an implementation of the present specification further provides a method for transaction risk control based on a graphical structure model. FIG. 3 is a schematic flowchart of the method for transaction risk control. A process in FIG. 3 includes the following steps.

S302: Obtain a graphical structure model trained by using labeled samples, where the graphical structure model is defined based on a transaction data network, and the transaction data network includes one or more nodes of a buyer user, a seller user, an e-commerce platform account, a third-party payment platform account, a bank card, and a product, and a relationship between the nodes; and the graphical structure model is configured to calculate embedding vectors of the nodes obtained after a plurality of iterations in a latent feature space based on original features of the nodes or features of associated edges between the nodes.

In an implementation of the present specification, the graphical structure model in FIG. 3 is trained by the method in FIG. 2, and the method in FIG. 3 can be understood with reference to the previous description of FIG. 2.

S304: Calculate an embedding vector corresponding to a to-be-tested sample by using the trained graphical structure model.

S306: Perform transaction risk control on the to-be-tested samples based on the corresponding embedding vectors, where the labeled samples are labeled whether a node corresponding to the labeled samples is a transaction risk node.

In an actual application, a prediction probability can intuitively represent a risk of a sample. Therefore, a prediction probability corresponding to the to-be-tested sample can further be calculated by using the trained graphical structure model based on the embedding vector corresponding to the to-be-tested sample, and transaction risk control can be performed on the to-be-tested sample based on the prediction probability corresponding to the to-be-tested sample in step S306.

It is worthwhile to note that the previous implementations are mainly described by using risk control as an example and the graphical structure model can alternatively be used in other circumstances. For example, if a sample labeling result indicates a certain type of hobby of a user, embedding vectors and/or a prediction probability calculated based on the graphical structure model can be used for a friend recommendation function in an instant messaging service, so that the user can be automatically matched with a friend having a similar hobby.

Figure 4:
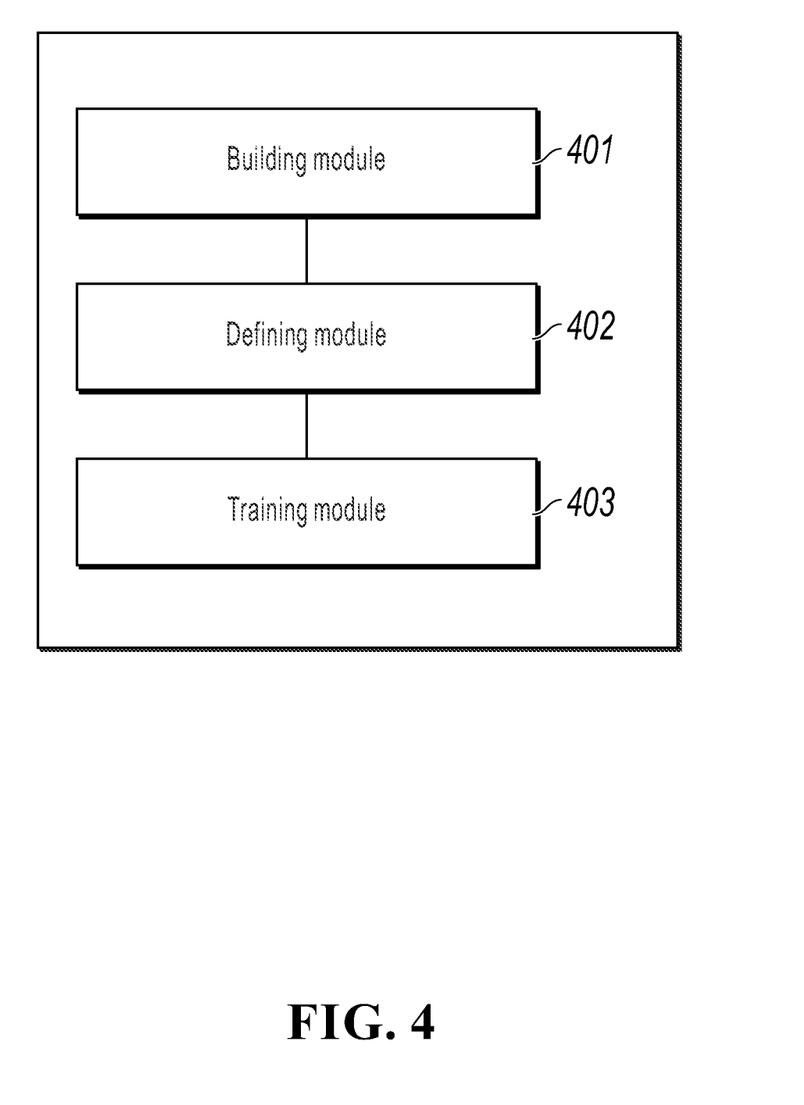
FIG. 4 is a schematic structural diagram illustrating a graphical structure model training apparatus corresponding to FIG. 2, according to an implementation of the present specification.
Figure 5:
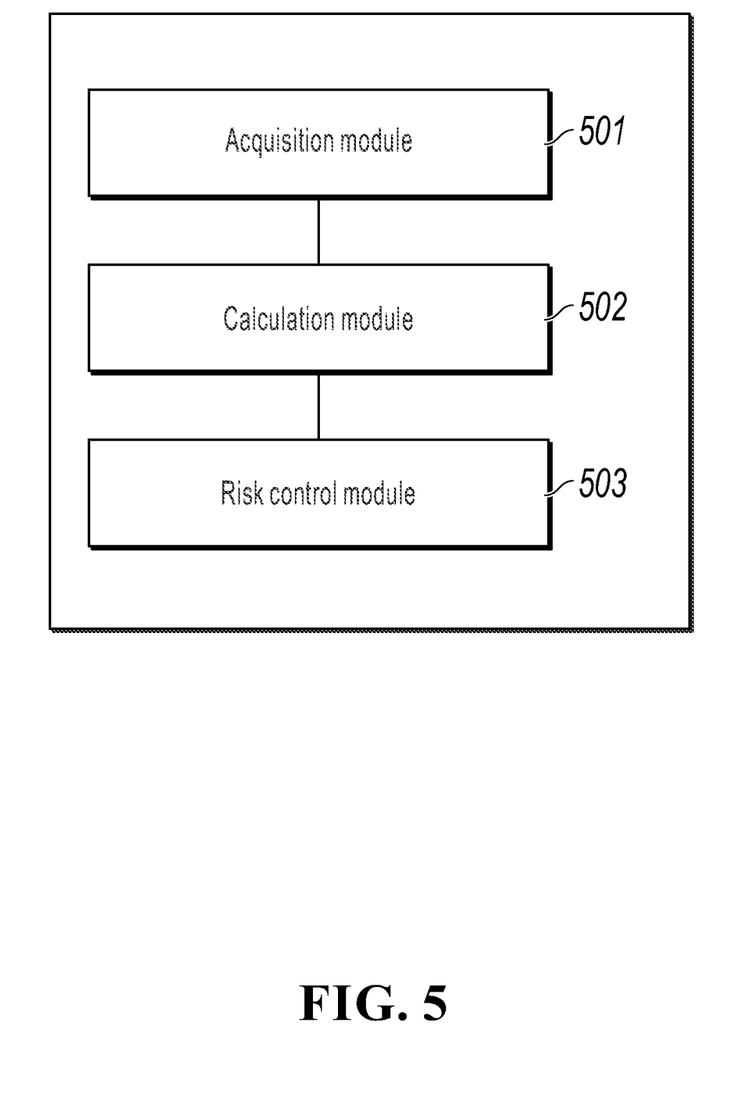
FIG. 5 is a schematic structural diagram illustrating an apparatus for transaction risk control based on a graphical structure model corresponding to FIG. 3, according to an implementation of the present specification.

Based on the same idea, implementations of the present specification further provide apparatuses corresponding to the described methods, as shown in FIG. 4 and FIG. 5.

FIG. 4 is a schematic structural diagram illustrating a graphical structure model training apparatus corresponding to FIG. 2, according to an implementation of the present specification. The apparatus includes the following: a building module 401, configured to build a transaction data network based on user transaction-related data, where the transaction data network includes one or more nodes of a buyer user, a seller user, an e-commerce platform account, a third-party payment platform account, a bank card, and a product, and a relationship between the nodes; a defining module 402, configured to define a graphical structure model based on the transaction data network, where the graphical structure model is configured to calculate embedding vectors of the nodes obtained after a plurality of iterations in a latent feature space based on original features of the nodes and/or features of associated edges between the nodes; and a training module 403, configured to train the graphical structure model by using labeled samples, where the labeled samples are labeled whether a node corresponding to the labeled samples is a transaction risk node.

FIG. 5 is a schematic structural diagram illustrating an apparatus for transaction risk control based on a graphical structure model corresponding to FIG. 3, according to an implementation of the present specification. The apparatus includes the following: an acquisition module 501, configured to obtain a graphical structure model trained by using labeled samples, where the graphical structure model is defined based on a transaction data network, and the transaction data network includes one or more nodes of a buyer user, a seller user, an e-commerce platform account, a third-party payment platform account, a bank card, and a product, and a relationship between the nodes; and the graphical structure model is configured to calculate embedding vectors of the nodes obtained after a plurality of iterations in a latent feature space based on original features of the nodes and/or features of associated edges between the nodes; a calculation module 502, configured to calculate embedding vectors corresponding to to-be-tested samples by using the trained graphical structure model; and a risk control module 503, configured to perform transaction risk control on the to-be-tested samples based on the corresponding embedding vectors; where the labeled samples are labeled whether a node corresponding to the labeled samples is a transaction risk node.

Optionally, the graphical structure model is further configured to calculate a prediction probability of the node based on the embedding vector, where the prediction probability represents a probability that the node is a transaction risk node.

The risk control module 503 performs transaction risk control on the to-be-tested samples based on the corresponding embedding vectors, specifically including: calculating, by the risk control module 503, a prediction probability corresponding to the to-be-tested sample by using the trained graphical structure model based on the embedding vector corresponding to the to-be-tested sample; and performing transaction risk control on the to-be-tested sample based on the prediction probability corresponding to the to-be-tested sample.

Optionally, the transaction data network is built based on user transaction-related data.

Optionally, the transaction data network includes one or a combination of the following networks: a transaction network formed by a buyer user and a seller user, a relationship network of a buyer user and a debit card corresponding to a buyer user account, a relationship network of a buyer user and a credit card corresponding to a buyer user account, a same-person relationship network between user accounts, a family relationship network between user accounts, and a network formed by a buyer user and a product, where the user account includes an e-commerce platform account and/or a third-party payment platform account.

Optionally, the original feature includes at least one of the following types of transaction data: a transaction amount, a quantity of transactions, a transaction time, a transaction location, a transaction target, and a transaction payment method; and the feature of the edge includes transaction data and/or interpersonal relationship data jointly involved by the nodes connected to the edge.

Optionally, an embedding vector of the node obtained after t iterations in the latent feature space is calculated based on the original feature of the node, a feature of an associated edge between the node and another node, and an embedding vector of the node obtained after t−1 iterations in the latent feature space.

Optionally, the calculating an embedding vector of the node obtained after a plurality of iterations in a latent feature space based on an original feature of the node and a feature of an associated edge between the nodes specifically includes the following: calculating, by the calculation module 502, the embedding vector of the node obtained after the plurality of iterations in the latent feature space based on the following equation:

$$H_i^t = \sigma\left(W_1 F_i + W_2 \sum_{j \in N_i} E_{ij} + W_3 \sum_{j \in N_i} \alpha_{ij} H_i^{t-1}\right);$$

where $H_i^t$ represents an embedding vector of the ith node obtained after t iterations in the latent feature space; $\sigma$ represents a nonlinear transformation function; $W_1$, $W_2$ and $W_3$ represent weight matrices; $F_i$ represents original features of the ith node; $E_{ij}$ represents features of associated edges between the ith node and the jth node; $N_i$ represents a set of adjacent nodes of the ith node; and $\alpha_{ij}$ represents a weight matrix for the ith node and the jth node.

Optionally, the calculating a prediction probability of the node based on the embedding vector specifically includes the following: calculating, by the calculation module 502, the prediction probability of the node based on the following equation:

$$pred_i = \text{softmax}(W_4 * H_i^T); \text{ where}$$

$pred_i$ represents a prediction probability of the ith node obtained after T iterations, and $W_4$ represents a weight matrix.

Optionally, training the graphical structure model by using the labeled samples specifically includes the following: training the graphical structure model by using the labeled samples with a training objective that consistency between the prediction probability and a sample labeling result corresponding to the prediction probability is maximized.

Optionally, training the graphical structure model by using the labeled samples specifically includes the following: optimizing arg $\min_{W_1,W_2,W_3,W_4} \Sigma_i \text{corss\_entrep}(\text{pred}_i,y_i)$ by using a back-propagation algorithm and the labeled samples to obtain optimal $W_1$, $W_2$, $W_3$, and $W_4$; where corss_entrep represents a function used to calculate cross entropy.

Based on the same idea, an implementation of the present specification provides a graphical structure model training device corresponding to FIG. 2, including: at least one processor; and at least one memory connects to and communicates with the at least one processor, where the memory stores an instruction executable by the at least one processor, and the instruction is executed by the at least one processor to enable the at least one processor to: build a transaction data network based on user transaction-related data, where the transaction data network includes one or more nodes of a buyer user, a seller user, an e-commerce platform account, a third-party payment platform account, a bank card, and a product, and a relationship between the nodes; define a graphical structure model based on the transaction data network, where the graphical structure model is configured to calculate embedding vectors of the nodes obtained after a plurality of iterations in a latent feature space based on original features of the nodes and/or features of associated edges between the nodes; and train the graphical structure model by using labeled samples, where the labeled samples are labeled whether a node corresponding to the labeled samples is a transaction risk node.

Based on the same idea, an implementation of the present specification provides a device for transaction risk control based on a graphical structure model corresponding to FIG. 3, including: at least one processor; and at least one memory connects to and communicates with the at least one processor, where the memory stores an instruction executable by the at least one processor, and the instruction is executed by the at least one processor to enable the at least one processor to: obtain a graphical structure model trained by using labeled samples, where the graphical structure model is defined based on a transaction data network, and the transaction data network includes one or more nodes of a buyer user, a seller user, an e-commerce platform account, a third-party payment platform account, a bank card, and a product, and a relationship between the nodes; and the graphical structure model is configured to calculate embedding vectors of the nodes obtained after a plurality of iterations in a latent feature space based on original features of the nodes and/or features of associated edges between the nodes; calculate embedding vectors corresponding to to-be-tested samples by using the trained graphical structure model; and perform transaction risk control on the to-be-tested samples based on the corresponding embedding vectors; where the labeled samples are labeled whether a node corresponding to the labeled samples is a transaction risk node.

Based on the same idea, an implementation of the present specification further provides a non-volatile computer storage medium corresponding to FIG. 2. The non-volatile computer storage medium stores a computer executable instruction. The computer executable instruction is set to perform the following: building a transaction data network based on user transaction-related data, where the transaction data network includes one or more nodes of a buyer user, a seller user, an e-commerce platform account, a third-party payment platform account, a bank card, and a product, and a relationship between the nodes; defining a graphical structure model based on the transaction data network, where the graphical structure model is configured to calculate embedding vectors of the nodes obtained after a plurality of iterations in a latent feature space based on original features of the nodes and/or features of associated edges between the nodes; and training the graphical structure model by using labeled samples, where the labeled samples are labeled whether a node corresponding to the labeled samples is a transaction risk node.

Based on the same idea, an implementation of the present specification further provides a non-volatile computer storage medium corresponding to FIG. 3. The non-volatile computer storage medium stores a computer executable instruction. The computer executable instruction is set to perform the following: obtaining a graphical structure model trained by using labeled samples, where the graphical structure model is defined based on a transaction data network, and the transaction data network includes one or more nodes of a buyer user, a seller user, an e-commerce platform account, a third-party payment platform account, a bank card, and a product, and a relationship between the nodes; and the graphical structure model is configured to calculate embedding vectors of the nodes obtained after a plurality of iterations in a latent feature space based on original features of the nodes and/or features of associated edges between the nodes; calculating embedding vectors corresponding to to-be-tested samples by using the trained graphical structure model; and performing transaction risk control on the to-be-tested samples based on the corresponding embedding vectors; where the labeled samples are labeled whether a node corresponding to the labeled samples is a transaction risk node.

The specific implementations of the present specification are described previously. Other implementations shall fall within the scope of the appended claims. In some cases, actions or steps described in the claims can be performed in a sequence different from a sequence in an implementation and still can achieve a desired result. In addition, a process depicted in the accompanying drawings does not necessarily need a particular sequence or consecutive sequence as shown to achieve the desired result. In some implementations, multi-task processing and parallel processing are also possible or can be advantageous.

The implementations in the present specification are described in a progressive way. For a same or similar part in the implementations, reference can be made to each other, and each implementation focuses on differences from another implementation. In particular, for an implementation of an apparatus, a device, or a non-volatile computer storage medium, description is relatively simple because the implementation of the apparatus, the device, or the non-volatile computer storage medium is basically similar to a method implementation, and reference can be made to some descriptions of the method embodiment.

The apparatus, the device, and the non-volatile computer storage medium provided in the implementations of the present specification correspond to the method. Therefore, the apparatus, the device, and the non-volatile computer storage medium also have a beneficial technical effect similar to a beneficial technical effect of the corresponding method. Since the beneficial technical effect of the method has been described in detail previously, the beneficial technical effect of the apparatus, the device, and the non-volatile computer storage medium that correspond to the method is omitted here for simplicity.

In the 1990s, improvements to a technology could clearly be distinguished from improvements to hardware (for example, improvements to circuit structures such as diodes, transistors, switches, etc.) or software (improvements to method processes). However, with the development of technologies, improvements of many method processes can be regarded as direct improvements of hardware circuit structures now. Designers almost always program an improved method process into a hardware circuit to get a corresponding hardware circuit structure. Therefore, it is possible to improve a method process by using a hardware entity module. For example, a programmable logic device (PLD) (for example, field programmable gate array (FPGA)) is such an integrated circuit, and a logical function of the PLD is determined by a user through programming the device. Designers independently program to "integrate" a digital system on a PLD without asking a chip manufacturer to design and prepare a dedicated integrated circuit chip. In addition, at present, instead of manually manufacturing an integrated chip, such programming is mostly implemented by using "logic compiler" software, which is similar to a software compiler used to develop and write a program. Original code needs to be written in a particular programming language for compilation. The language is referred to as hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer readable program code, logic programming can be performed on method steps to allow the controller to implement the same function in forms of the logic gate, the switch, the application-specific integrated circuit, the programmable logic controller, and the embedded microcontroller. Therefore, the controller can be considered as a hardware component, and an apparatus included in the controller for implementing various functions can also be considered as a structure within the hardware component. Or, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementing device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, the functions of the units can be implemented in one or more pieces of software and/or hardware.

A person skilled in the art should understand that the implementations of the present specification can be provided as methods, systems, or computer program products. Therefore, the implementations of the present specification can use a form of hardware only implementations, software only implementations, or implementations with a combination of software and hardware. Furthermore, the implementations of the present specification can use a form of a computer program product that is implemented on one or more computer-usable storage media (including but not limited to a magnetic disk memory, a CD-ROM, an optical memory, etc.) that include computer-usable program code.

The present specification is described with reference to the method, the device (system), and a flowchart and/or a block diagram of the computer program product according to the implementations of the present specification. It should be understood that computer program instructions can be used to implement each process in the flowchart and/or each block in the block diagram, and a combination of a process in a flowchart and/or a block in a block diagram. These computer program instructions can be provided to a processor of a general-purpose computer, a special-purpose computer, an embedded processor or another programmable data processing device to produce a machine, so that instructions executed by a processor of a computer or another programmable data processing device produce an apparatus for implementing functions specified in one or more processes of the flowchart and/or one or more blocks of the block diagram.

These computer program instructions can also be stored in a computer-readable memory that can direct a computer or another programmable data processing device to work in a particular way, so that the instructions stored in the computer-readable memory produce a manufacture that includes an instruction apparatus. The instruction apparatus implements the functions specified in one or more processes of the flowchart and/or one or more blocks of the block diagram.

These computer program instructions can also be loaded onto a computer or another programmable data processing device so that a series of operational steps are performed on the computer or the another programmable device to produce processing implemented by a computer. As such, instructions executed on the computer or the another programmable device provide steps for implementing the functions specified in one or more processes in the flowchart and/or one or more blocks in the block diagram.

In a typical configuration, a computing device includes one or more processors (CPUs), an input/output interface, a network interface, and a memory.

The memory might include a non-persistent memory, a random access memory (RAM), and/or a non-volatile memory in a computer-readable medium, such as a read-only memory (ROM) or a flash random access memory (flash RAM). The memory is an example of the computer-readable medium.

The computer-readable medium includes persistent, non-persistent, movable, and unmovable media that can implement information storage by using any method or technology. The information can be a computer-readable instruction, a data structure, a program module, or other data. Examples of storage media for a computer include, but are not limited to, a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disk (DVD) or another optical storage, a magnetic cassette tape, a magnetic tape magnetic disk storage or another magnetic storage device or any other non-transmission medium that can be configured to store information accessible to the computing device. As described in the present specification, the computer-readable medium does not include transitory media, such as modulated data signals and carriers.

It should also be noted that, the terms "include", "comprise", or their any other variant are intended to cover a non-exclusive inclusion, so that a process, a method, a product, or a device that includes a list of elements not only includes those elements but also includes other elements which are not expressly listed, or further includes elements inherent to such process, method, product, or device. An element confined by "includes a . . . " does not, without more constraints, preclude the presence of additional identical elements in the process, method, product, or device that includes the element.

The present specification can be described in a general context of computer executable instructions executed by a computer, such as a program module. Generally, the program module includes a routine, a program, an object, a component, a data structure, etc. executing a specific task or implementing a specific abstract data type. It is also possible to practice the present specification in distributed computing environments where tasks are performed by remote processing devices connected through a communication network. In a distributed computing environment, the program module can be located in local and remote computer storage media including storage devices.

The implementations in the present specification are described in a progressive way. For a same or similar part in the implementations, reference can be made to each other, and each implementation focuses on differences from another implementation. In particular, for a system implementation, description is relatively simple because the system implementation is basically similar to a method implementation, and reference can be made to some descriptions of the method implementation.

The previous descriptions are merely implementations of the present specification and are not intended to limit the present application. For a person skilled in the art, the present application is subject to a plurality of modifications and changes. Any modification, equivalent replacement, or improvement made within the spirit and principles of the present application shall be included in the claims of the present application.

What is claimed is:

1. A computer-implemented method for risk control of transactions, comprising:
   generating, by at least one computer based on a transaction data network, a graphical structure model comprising a graph including nodes and edges, the nodes representing entities in the transaction data network, the edges representing relationships between the entities;
   training, by the at least one computer, the graphical structure model based on features of the nodes and edges in the graph using a set of labeled samples during an iterative training process that continues until a maximizing condition is satisfied, the iterative training process comprising:
      calculating, by the at least one computer, an embedding vector of a node in a latent feature space based on nonlinearly transforming a weighted combination of i) an original feature of the node or ii) a sum of an edge feature of each edge associated with the node, and iii) a weighted sum of an embedding vector from a previous iteration that is weighted using a matrix for the node and each adjacent node; and
      maximizing, by the at least one computer, a consistency between a predicted result based on the embedding vector and the labeled sample corresponding to the node, wherein each of the set of labeled samples comprises a label indicating whether a corresponding node in the graphical structure model is a risky transaction node;
   calculating, by the at least one computer, an embedding vector of an input sample using the trained graphical structure model; and
   performing, by the at least one computer, transaction risk control on the input sample based on the embedding vector of the input sample, wherein performing the transaction risk control comprises labeling the input sample as a transaction risk node.

2. The computer-implemented method of claim 1, wherein:
   the trained graphical structure model is further configured to calculate a predicted probability of the node based on the embedding vector of the node, wherein the predicted probability represents a probability that the node is a risky transaction node; and
   performing transaction risk control on the input sample based on the embedding vector of the input sample comprises:
      calculating, by the at least one computer using the trained graphical structure model, a predicted probability corresponding to the input sample based on the embedding vector of the input sample; and
      performing, by the at least one computer, transaction risk control on the input sample based on the predicted probability of the input sample.

3. The computer-implemented method of claim 2, wherein training the graphical structure model using the set of labeled samples comprises:
   training, by the at least one computer, the graphical structure model using the set of labeled samples with a training objective that a consistency between the predicted probability and a corresponding sample labeling result is maximized.

4. The computer-implemented method of claim 2, wherein calculating the predicted probability of the node based on the embedding vector comprises:

calculating, by the at least one computer, the predicted probability of the node based on the following equation:

$$\text{pred}_i = \text{softmax}(W_4 * H_i^T),$$

wherein $\text{pred}_i$ represents the predicted probability of the ith node obtained after T iterations, and $W_4$ represents a weight matrix.

5. The computer-implemented method of claim 4, wherein training the graphical structure model using the set of labeled samples comprises:
optimizing, by the at least one computer using a back-propagation algorithm and the set of labeled samples, $\arg\min_{W_1,W_2,W_3,W_4} \Sigma_i \text{corss\_entrep}(\text{pred}_i, y_i)$ to obtain optimal $W_1$, $W_2$, $W_3$, and $W_4$, wherein corss_entrep represents a function that is used to calculate cross entropy.

6. The computer-implemented method of claim 1, wherein an embedding vector of the node obtained after the $t^{th}$ iteration in the latent feature space is calculated based on the original feature of the node, the edge feature of each associated edge between the node and another node, and an embedding vector of the node obtained after the $(t-1)^{th}$ iteration in the latent feature space.

7. The computer-implemented method of claim 1, wherein the transaction data network is built based on user transaction-related data.

8. The computer-implemented method of claim 1, wherein:
each entity of the entities comprise one of the following: a buyer user, a seller user, a buyer user account, an e-commerce platform account, a third-party payment platform account, a bank card, or a product; and
the transaction data network comprises one or more of the following networks: a transaction network formed by the buyer user and the seller user, a relationship network of the buyer user and a debit card corresponding to the buyer user account, a relationship network of the buyer user and a credit card corresponding to the buyer user account, a same-person relationship network between user accounts, a family relationship network between user accounts, and a network formed by the buyer user and the product, wherein the user account comprises the e-commerce platform account or the third-party payment platform account.

9. The computer-implemented method of claim 1, wherein:
the original feature of the node comprises at least one of the following types of transaction data: a transaction amount, a quantity of transactions, a transaction time, a transaction location, a transaction target, and a transaction payment method; and
the edge feature of each edge comprises transaction data or interpersonal relationship data jointly involved by nodes connected to the edge.

10. A non-transitory, computer-readable medium storing one or more instructions executable by a computer system to perform operations for risk control of transactions, comprising:
generating based on a transaction data network, a graphical structure model comprising a graph including nodes and edges, the nodes representing entities in the transaction data network, the edges representing relationships between the entities;
training the graphical structure model based on features of the nodes and edges in the graph using a set of labeled samples during an iterative training process that continues until a maximizing condition is satisfied, the iterative training process comprising:
calculating an embedding vector of a node in a latent feature space based on nonlinearly transforming a weighted combination of i) an original feature of the node or ii) a sum of an edge feature of each edge associated with the node, and iii) a weighted sum of an embedding vector from a previous iteration that is weighted using a matrix for the node and each adjacent node; and
maximizing a consistency between a predicted result based on the embedding vector and the labeled sample corresponding to the node, wherein each of the set of labeled samples comprises a label indicating whether a corresponding node in the graphical structure model is a risky transaction node;
calculating an embedding vector of an input sample using the trained graphical structure model; and
performing transaction risk control on the input sample based on the embedding vector of the input sample, wherein performing the transaction risk control comprises labeling the input sample as a transaction risk node.

11. The non-transitory, computer-readable medium of claim 10, wherein:
the trained graphical structure model is further configured to calculate a predicted probability of the node based on the embedding vector of the node, wherein the predicted probability represents a probability that the node is a risky transaction node; and
performing transaction risk control on the input sample based on the embedding vector of the input sample comprises:
calculating, using the trained graphical structure model, a predicted probability corresponding to the input sample based on the embedding vector of the input sample; and
performing transaction risk control on the input sample based on the predicted probability of the input sample.

12. The non-transitory, computer-readable medium of claim 11, wherein training the graphical structure model using the set of labeled samples comprises:
training the graphical structure model using the set of labeled samples with a training objective that a consistency between the predicted probability and a corresponding sample labeling result is maximized.

13. The non-transitory, computer-readable medium of claim 11, wherein calculating the predicted probability of the node based on the embedding vector comprises:
calculating the predicted probability of the node based on the following equation:

$$\text{pred}_i = \text{softmax}(W_4 * H_i^T),$$

wherein $\text{pred}_i$ represents the predicted probability of the ith node obtained after T iterations, and $W_4$ represents a weight matrix.

14. The non-transitory, computer-readable medium of claim 13, wherein training the graphical structure model using the set of labeled samples comprises:
optimizing, using a back-propagation algorithm and the set of labeled samples, $\arg\min_{W_1,W_2,W_3,W_4} \Sigma_i \text{corss\_entrep}(\text{pred}_i, y_i)$ to obtain optimal $W_1$, $W_2$, $W_3$, and $W_4$, wherein corss_entrep represents a function that is used to calculate cross entropy.

15. The non-transitory, computer-readable medium of claim 10, wherein an embedding vector of the node obtained after the $t^{th}$ iteration in the latent feature space is calculated based on the original feature of the node, the edge feature of each associated edge between the node and another node, and an embedding vector of the node obtained after the $(t-1)^{th}$ iteration in the latent feature space.

16. The non-transitory, computer-readable medium of claim 10, wherein the transaction data network is built based on user transaction-related data.

17. The non-transitory, computer-readable medium of claim 10, wherein:
   each entity of the entities comprise one of the following: a buyer user, a seller user, a buyer user account, an e-commerce platform account, a third-party payment platform account, a bank card, or a product; and
   the transaction data network comprises one or more of the following networks: a transaction network formed by the buyer user and the seller user, a relationship network of the buyer user and a debit card corresponding to the buyer user account, a relationship network of the buyer user and a credit card corresponding to the buyer user account, a same-person relationship network between user accounts, a family relationship network between user accounts, and a network formed by the buyer user and the product, wherein the user account comprises the e-commerce platform account or the third-party payment platform account.

18. The non-transitory, computer-readable medium of claim 10, wherein:
   the original feature of the node comprises at least one of the following types of transaction data: a transaction amount, a quantity of transactions, a transaction time, a transaction location, a transaction target, and a transaction payment method; and
   the edge feature of each edge comprises transaction data or interpersonal relationship data jointly involved by nodes connected to the edge.

19. A computer-implemented system for risk control of transactions, comprising:
   one or more computers; and one or more computer memory devices interoperably coupled with the one or more computers and having tangible, non-transitory, machine-readable media storing one or more instructions that, when executed by the one or more computers, perform one or more operations comprising:
   generating, based on a transaction data network, a graphical structure model comprising a graph including nodes and edges, the nodes representing entities in the transaction data network, the edges representing relationships between the entities;
   training the graphical structure model based on features of the nodes and edges in the graph using a set of labeled samples during an iterative training process that continues until a maximizing condition is satisfied, the iterative training process comprising:
      calculating an embedding vector of a node in a latent feature space based on nonlinearly transforming a weighted combination of i) an original feature of the node or ii) a sum of an edge feature of each edge associated with the node, and iii) a weighted sum of an embedding vector from a previous iteration that is weighted using a matrix for the node and each adjacent node; and
      maximizing a consistency between a predicted result based on the embedding vector and the labeled sample corresponding to the node, wherein each of the set of labeled samples comprises a label indicating whether a corresponding node in the graphical structure model is a risky transaction node;
   calculating an embedding vector of an input sample using the trained graphical structure model; and
   performing transaction risk control on the input sample based on the embedding vector of the input sample, wherein performing the transaction risk control comprises labeling the input sample as a transaction risk node.

20. The computer-implemented system of claim 19, wherein:
   the trained graphical structure model is further configured to calculate a predicted probability of the node based on the embedding vector of the node, wherein the predicted probability represents a probability that the node is a risky transaction node; and
   performing transaction risk control on the input sample based on the embedding vector of the input sample comprises:
      calculating, using the trained graphical structure model, a predicted probability corresponding to the input sample based on the embedding vector of the input sample; and
      performing transaction risk control on the input sample based on the predicted probability of the input sample.

21. The computer-implemented system of claim 20, wherein training the graphical structure model using the set of labeled samples comprises:
   training the graphical structure model using the set of labeled samples with a training objective that a consistency between the predicted probability and a corresponding sample labeling result is maximized.

22. The computer-implemented system of claim 20, wherein calculating the predicted probability of the node based on the embedding vector comprises:
   calculating the predicted probability of the node based on the following equation:

$$\text{pred}_i = \text{softmax}(W_4 * H_i^T),$$

wherein $\text{pred}_i$ represents the predicted probability of the ith node obtained after T iterations, and $W_4$ represents a weight matrix.

23. The computer-implemented system of claim 22, wherein training the graphical structure model using the set of labeled samples comprises:
   optimizing, using a back-propagation algorithm and the set of labeled samples, $\arg\min_{W_1,W_2,W_3,W_4} \Sigma_i \text{corss\_entrep}(\text{pred}_i, y_i)$ to obtain optimal $W_1$, $W_2$, $W_3$, and $W_4$, wherein
corss_entrep represents a function that is used to calculate cross entropy.

24. The computer-implemented system of claim 19, wherein an embedding vector of the node obtained after the $t^{th}$ iteration in the latent feature space is calculated based on the original feature of the node, the edge feature of each associated edge between the node and another node, and an embedding vector of the node obtained after the $(t-1)^{th}$ iteration in the latent feature space.

25. The computer-implemented system of claim 19, wherein the transaction data network is built based on user transaction-related data.

26. The computer-implemented system of claim 19, wherein:

each entity of the entities comprise one of the following: a buyer user, a seller user, a buyer user account, an e-commerce platform account, a third-party payment platform account, a bank card, or a product; and the transaction data network comprises one or more of the following networks: a transaction network formed by the buyer user and the seller user, a relationship network of the buyer user and a debit card corresponding to the buyer user account, a relationship network of the buyer user and a credit card corresponding to the buyer user account, a same-person relationship network between user accounts, a family relationship network between user accounts, and a network formed by the buyer user and the product, wherein the user account comprises the e-commerce platform account or the third-party payment platform account.

27. The computer-implemented system of claim 19, wherein:

the original feature of the node comprises at least one of the following types of transaction data: a transaction amount, a quantity of transactions, a transaction time, a transaction location, a transaction target, and a transaction payment method; and the edge feature of each edge comprises transaction data or interpersonal relationship data jointly involved by nodes connected to the edge.

28. The computer-implemented method of claim 1, wherein performing the transaction risk control on the input sample further comprises:

transmitting, by the at least one computer, the embedding vector of the input sample to other models including at least one of a supervised model, an unsupervised model, and a reinforcement learning model.

29. The computer-implemented method of claim 1, wherein calculating the embedding vector of the node in the latent feature space based on the original feature of the node or the edge feature of each edge associated with the node, and the embedding vector from the previous iteration comprises:

calculating the embedding vector of the node based on $$H_i^t = \sigma\left(W_1 F_i + W_2 \sum_{j \in N_i} E_{ij} + W_3 \sum_{j \in N_i} \alpha_{ij} H_i^{t-1}\right),$$

wherein $H_i^T$ represents the embedding vector of the ith node obtained after the $t^{th}$ iteration in the latent feature space; σ represents a nonlinear transformation function; $W_1$, $W_2$, and $W_3$ represent weight matrices; $F_i$ represents the original feature of the ith node; $E_{ij}$ represents the edge feature of an edge between the ith node and the jth node; $N_i$ represents a set of adjacent nodes of the ith node; and $\alpha_{ij}$ represents a weight matrix for the ith node and the jth node.

30. The non-transitory, computer-readable medium of claim 10, wherein calculating the embedding vector of the node in the latent feature space based on the original feature of the node or the edge feature of each edge associated with the node, and the embedding vector from the previous iteration comprises:

calculating the embedding vector of the node based on $$H_i^t = \sigma\left(W_1 F_i + W_2 \sum_{j \in N_i} E_{ij} + W_3 \sum_{j \in N_i} \alpha_{ij} H_i^{t-1}\right),$$

wherein $H_i^t$ represents the embedding vector of the ith node obtained after the $t^{th}$ iteration in the latent feature space; σ represents a nonlinear transformation function; $W_1$, $W_2$, and $W_3$ represent weight matrices; $F_i$ represents the original feature of the ith node; $E_{ij}$ represents the edge feature of an edge between the ith node and the jth node; $N_i$ represents a set of adjacent nodes of the ith node; and $\alpha_{ij}$ represents a weight matrix for the ith node and the jth node.

31. The computer-implemented system of claim 19, wherein calculating the embedding vector of the node in the latent feature space based on the original feature of the node or the edge feature of each edge associated with the node, and the embedding vector from the previous iteration comprises:

calculating the embedding vector of the node based on $$H_i^t = \sigma\left(W_1 F_i + W_2 \sum_{j \in N_i} E_{ij} + W_3 \sum_{j \in N_i} \alpha_{ij} H_i^{t-1}\right),$$

wherein $H_i^t$ represents the embedding vector of the ith node obtained after the $t^{th}$ iteration in the latent feature space; σ represents a nonlinear transformation function; $W_1$, $W_2$, and $W_3$ represent weight matrices; $F_i$ represents the original feature of the ith node; $E_{ij}$ represents the edge feature of an edge between the ith node and the jth node; $N_i$ represents a set of adjacent nodes of the ith node; and $\alpha_{ij}$ represents a weight matrix for the ith node and the jth node.

32. The computer-implemented method of claim 1, wherein the original feature of the node is weighted with a first weight matrix, the sum of the edge feature of each edge associated with the node is weighted with a second weight matrix, and the weighed sum of the embedding vector from the previous iteration is weighted with a third weight matrix.

* * * * *

UNITED STATES PATENT AND TRADEMARK OFFICE
CERTIFICATE OF CORRECTION

PATENT NO. : 11,526,766 B2
APPLICATION NO. : 16/805387
DATED : December 13, 2022
INVENTOR(S) : Le Song et al.

It is certified that error appears in the above-identified patent and that said Letters Patent is hereby corrected as shown below:

In the Claims

Column 21, Line 47, in Claim 29, "$H_i^T$" should read -- $H_i^t$ --.

Signed and Sealed this
Fourteenth Day of March, 2023

Katherine Kelly Vidal
Director of the United States Patent and Trademark Office